(No Model.)
C. S. BRADLEY.
ALTERNATING CURRENT TRANSFORMER.
No. 519,376. Patented May 8, 1894.
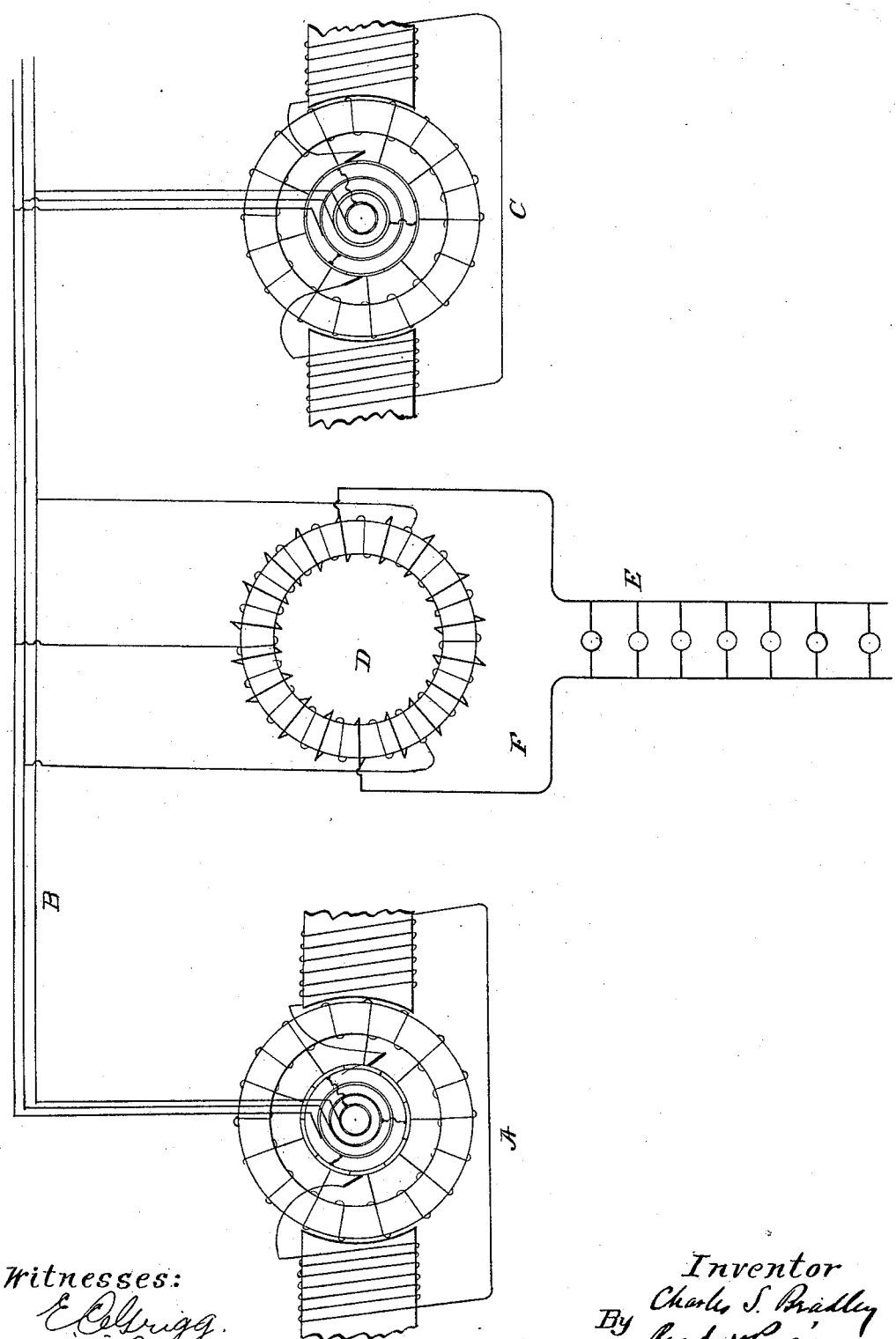
Witnesses:
E. Colbrigg.
J. C. Spaeth.
Inventor
Charles S. Bradley
By Read & Price
his Attorneys

UNITED STATES PATENT OFFICE.

CHARLES S. BRADLEY, OF AVON, NEW YORK.

ALTERNATING-CURRENT TRANSFORMER.

SPECIFICATION forming part of Letters Patent No. 519,376, dated May 8, 1894.

Application filed March 15, 1892. Serial No. 425,038. (No model.)

*To all whom it may concern:*

Be it known that I, CHARLES S. BRADLEY, a citizen of the United States, residing at Avon, in the county of Livingston and State of New York, have invented certain new and useful Improvements in Alternating-Current Transformers; and I do hereby declare the following to be a full, clear, and exact description of the invention, such as will enable others skilled in the art to which it appertains to make and use the same.

This invention relates to an alternating current transformer as used in connection with a system of polyphase alternating currents, the object being to produce from polyphase currents an induced alternating current of single phase. A prior patent issued to me numbered 409,450, and dated August 20, 1889, describes a generator by which a three phase alternating current may be developed and led into an external circuit by means of three wires, by which a rotation of magnetism may be developed in one element of a motor without the intermediation of a commutator. Such a three-phase current is applicable to my present invention, though, as will be understood, any system of polyphase currents by which a rotation of magnetism in the transformer core may be produced can be used.

In the accompanying drawing which illustrates the invention is shown at A a generator by which polyphase alternating currents may be delivered into the circuit B. The generator I prefer to use comprises a closed coil armature having its winding tapped at three equi-distant points and connected with a three-wire external circuit. Either the field or armature may be the rotating element; as shown, the armature is the rotating element. The field-magnets may be charged through a commutator which leads a direct current through its brushes into the field-magnet circuit. As thus constructed the generator will deliver into the circuit B three alternating currents differing in phase by one hundred and twenty degrees. With this circuit may be connected a motor similar in construction to the generator and which will operate at high efficiency under the influence of the three-phase alternating current. Such a motor is illustrated at C.

At D is a transformer provided with a closed coil winding tapped at three equi-distant points and connected with the three wires of the circuit B. As thus constructed when the generator is in action a rotary field will be developed in the core of the transformer. If a closed coil secondary circuit be wound in inductive relation to the primary circuit of this transformer, as indicated at D, and this coil be tapped at two opposite points and connection be made with an external circuit E, there will be developed in said circuit E a single phase alternating current, the electro-motive-force of which will depend upon the resultant of the three electro-motive-forces in the primary and the ratio of transformation. In this external circuit translating devices of any suitable character may be included. As illustrated in the drawing lamps are placed therein.

It will of course be understood that if currents of any number of phases were transmitted over the line, which would by their action in the transformer develop a rotation of magnetism therein, a single alternating current might be developed in the secondary circuit. It will be noted that the secondary circuit is formed of two branches which are connected in multiple arc relation, and that both branches feed into the consumption circuit. The number of convolutions in the secondary circuit will be such that the current will be of a safe electro-motive-force.

Having thus described my invention, what I claim as new, and desire to secure by Letters Patent, is—

1. The combination with a polyphase alternating current circuit of a transformer having its primary connected at a number of points with such circuit so as to develop a rotation of magnetism in the core of the transformer, and a single secondary circuit having its convolutions uniformly distributed with reference to the coils of the primary winding connecting with a single distribution circuit.

2. The combination with a polyphase alternating current circuit of a transformer having a closed coil winding connected with the several wires of the polyphase circuit, said transformer being provided with a closed coil secondary winding tapped at two opposite points for connection with the distribution circuit.

In testimony whereof I affix my signature in presence of two witnesses.

CHARLES S. BRADLEY.

Witnesses:
VICTOR E. BURKE,
E. C. GRIGG.